US008166453B2

(12) United States Patent
Kuester et al.

(10) Patent No.: US 8,166,453 B2
(45) Date of Patent: Apr. 24, 2012

(54) METHOD AND SYSTEM FOR INCONSISTENCY RESOLUTION WITH CYCLE DETECTION IN A MODEL-DRIVEN SOFTWARE ENVIRONMENT

(75) Inventors: Jochen M. Kuester, Zurich (CH); Ksenia Ryndina, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 12/017,139

(22) Filed: Jan. 21, 2008

(65) Prior Publication Data

US 2009/0187889 A1     Jul. 23, 2009

(51) Int. Cl.
G06F 9/44 (2006.01)
G06F 9/45 (2006.01)
G06Q 10/00 (2006.01)
G05B 13/02 (2006.01)

(52) U.S. Cl. ............. 717/105; 705/348; 700/31; 703/22
(58) Field of Classification Search .................. 717/105; 705/348; 700/31; 703/22
See application file for complete search history.

(56) References Cited

U.S. PATENT DOCUMENTS

| | | | |
|---|---|---|---|
| 7,089,529 B2* | 8/2006 | Sweitzer et al. | 717/104 |
| 7,185,289 B1* | 2/2007 | Taima | 715/810 |
| 7,958,486 B2* | 6/2011 | Tsyganskiy et al. | 717/105 |
| 2002/0091990 A1* | 7/2002 | Little et al. | 717/105 |
| 2003/0105620 A1* | 6/2003 | Bowen | 703/22 |
| 2005/0080609 A1* | 4/2005 | Bhaskaran et al. | 703/22 |
| 2006/0136864 A1* | 6/2006 | Choi et al. | 717/104 |

OTHER PUBLICATIONS

Mens et al., "Detecting and Resolving Model Inconsistencies Using Transformation Dependency Analysis," Springer-Verlag, 2006, 15pg.*
Nuseibeh et al., "Leveraging Inconsistency in Software Development," IEEE, 2000, 6pg.*
Van Der Stratten et al., "Model Refactorings through Rule-Based Inconsistency Resolution," ACM, 2006, 8pg.*
Kuester et al., "Improving Inconsistency Resolution with Side-Effect Evaluation and Costs," Springer-Verlag, 2007, 15pg.*
John Grundy et al., Inconsistency Management for Multiple-View Software Development Environments, IEEE Transaction on Software Engineering, 24(11): 1998, 28 pages.
Alexander Egyed, Fixing Inconsistencies in UML Design Models, Proceedings of the 29th International Conference on Software Engineering (ICSE), May 2007, 10 pages.

(Continued)

*Primary Examiner* — Li Zhen
*Assistant Examiner* — Ryan Coyer
(74) *Attorney, Agent, or Firm* — Cantor Colburn LLP; Daniel Morris

(57) ABSTRACT

A method and system for inconsistency resolution in a model-driven software development environment are provided. A method includes performing a safety analysis for resolutions in response to detected inconsistencies to determine whether the resolution, if implemented, will lead to a resolution cycle when applied to a given inconsistency. The determination includes processing a resolution tree for the inconsistency and, using a resolution strategy tree, for each resolution that resolves an inconsistency, analyzing whether beginning with the resolution, it is possible to resolve all the inconsistencies subsequently introduced as side effects without a resolution cycle occurring. The analysis includes traversing the resolution strategy tree, whereby all resolution strategies derived by traversing the resolution strategy tree lead to a resolution cycle if the resolution strategy tree is infinite. The method includes categorizing the resolution that resolves the inconsistency and applying a resolution for the inconsistency based upon the resolution category.

7 Claims, 7 Drawing Sheets

OTHER PUBLICATIONS

Jochen M. Kuster et al., Generation of Business Process Models for Object Life Cycle Compliance, 5th International Conference on Business Process Management (BPM), Brisbane, Sep. 2007, 17 pages.

Jochen M. Kuster et al., Improving Inconsistency Resolution with Side-Effect Evaluation and Costs, ACM/IEEE 10th International Conference on Model Driven Engineering Languages and Systems (MODELS), Nashville, Oct. 2007, 15 pages.

U.A. Nickel et al., The FUJABA Environment, Proceedings of the 22nd International Conference on Software Engineering (ICSE), Limerick, Ireland, 2000, 4 pages.

B. Nuseibeh et al., Making Inconsistency Respectable in Software Development, Journal of Systems and Software, Sep. 2001, 19 pages.

Robert Wagner et al., A Plug-In for Flexible and Incremental Consistency Management, Proceedings of the International Conference on the Unified Modeling Language, San Francisco, 2003, 8 pages.

Alexander Egyed, Instant Consistency Checking for the UML, ICSE 2006, ACM Press, 10 pages.

N. S. Caswell, et al., Business Artifacts: An Approach to Operational Specification, IBM Systems Journal, Copyright 2003, pp. 428-445, vol. 42, No. 3, USA.

Joachim Herbst, et al., Data-Driven Modeling and Coordination of Large Process Structures, 2007, pp. 1-18, DaimlerChrysler AG Group Research, United States.

Joachim Herbst, et al., Flexibility of Data-Driven Process Structures, In: Proc. of BPM 2006 International Workshops, Dynamic Process Management (DPM), pp. 179-190, LNCS 4103 Springer Verlag.

Lionel C. Briand, et al., A Unified Framework for Coupling Measurement in Object-Oriented Systems, IEEE Transactions on Software Engineering, Jan./Feb. 1999, pp. 91-121, vol. 25, No. 1.

K. Bhattacharya, et al, A Model-Driven Approach to Industrializing Discovery Process in Pharmaceutical Research, IBM Systems Journal, 2005, pp. 145-162, vol. 44, No. 1, IBM.

W.M.P. Van Der Aalst, et al., Workflow Patterns, pp. 1-70, Copyright 2003 Springer.

W.M.P. Van Der Aalst, et al., Proclets: A Framework for Lightweight Interacting Workflow Processes, International Journal of Cooperative Information Systems, 2001, pp. 443-481, vol. 10, No. 4, World Scientific Publishing Company.

Hajo A. Reijers, et al., Cohesion and Coupling Metrics for Workflow Process Design, BPM, 2004, pp. 290-305, Springer-Verlag Berlin Heidelberg.

Harald Gall, et al., Consistency of Business Process Models and Object Life Cycles, MoDELS Workshops, 2007, pp. 80-90, Springer-Verlag Berlin Heidelberg.

Harald Gall, et al., A Tool for Integrating Object Life Cycle and Business Process Modeling, vol. 272/BPM07, pp. 1-4.

* cited by examiner

METHOD AND SYSTEM FOR INCONSISTENCY RESOLUTION WITH CYCLE DETECTION IN A MODEL-DRIVEN SOFTWARE ENVIRONMENT

CROSS-REFERENCE TO RELATED APPLICATIONS

This application contains subject matter which is related to the subject matter of the following applications, each of which is assigned to the same assignee as this application, International Business Machines Corporation of Armonk, N.Y. Each of the below listed applications is hereby incorporated herein by reference in its entirety: U.S. patent application 12/017,133, entitled "METHOD AND SYSTEM FOR GUIDED INCONSISTENCY RESOLUTION IN A MODEL-DRIVEN SOFTWARE ENVIRONMENT," filed on Jan. 21, 2008, the contents of which are incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to model-driven software development, and particularly to a method and system for inconsistency resolution with cycle detection in a model-driven software development environment.

2. Description of Background

During development of a business process management application, business process models and object life cycles provide two complementary views on the system being developed. Business process models show the system in terms of tasks that have to be performed, as well as control and data flow between these tasks. On the other hand, object life cycles focus on one specific data type and how states of objects of this type change across different business processes.

To make the best use of the business process model and object life cycle views in a modeling tool, the user should be able to switch back and forth between them, as well as make changes in either of the views. Making changes to one of the views introduces inconsistencies between the underlying models. As there is often more than one way to propagate a change in one model to the other, the introduced inconsistencies cannot be resolved automatically, and appropriate resolutions need to be selected by the user. In a model-driven software development process, it is common practice to create several models that represent different aspects of the same system. As these models are not independent from each other, consistency between them needs to be maintained. Furthermore, model consistency also plays an important role when reference models are used for alignment with standards and best practices. In this case, a certain level of consistency between models representing a given system and reference models needs to be established.

In order to check consistency of two models, consistency conditions are usually defined. Violations of these consistency conditions give rise to model inconsistencies that need to be resolved. For many types of models, inconsistency resolution is a very challenging and time-consuming process. This is especially the case when inconsistency resolutions have side effects, e.g., applying a resolution introduces new inconsistencies or resolves more than one inconsistency. Resolution side effects can give rise to resolution cycles, which may greatly complicate the resolution process.

Although consistency and inconsistency management have been the subjects of much research in recent years, there is still very little guidance offered to the user during the inconsistency resolution process in existing commercial and academic modeling tools.

What is needed, therefore, is a way to analyze inconsistency resolutions to determine whether they can lead to a resolution cycle, which can be communicated to a user before a particular resolution path is followed.

SUMMARY OF THE INVENTION

The shortcomings of the prior art are overcome and additional advantages are provided through the provision of a method for inconsistency resolution with cycle detection in a model-driven software environment. The method includes performing a safety analysis for resolutions in response to detected inconsistencies to determine whether the resolution, if implemented, will lead to a resolution cycle when applied to a given inconsistency. The determination includes processing a resolution tree for the inconsistency and, using a resolution strategy tree, for each resolution that resolves an inconsistency, analyzing whether beginning with the resolution, it is possible to resolve all the inconsistencies subsequently introduced as side effects without a resolution cycle occurring. The analysis includes traversing the resolution strategy tree, whereby all resolution strategies derived by traversing the resolution strategy tree lead to a resolution cycle if the resolution strategy tree is infinite. The method includes categorizing the resolution that resolves the inconsistency and applying a resolution for the inconsistency based upon the resolution category.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that analyzes inconsistency resolutions to determine whether they can lead to a resolution cycle, which can then be communicated to a user before a particular resolution path is followed. The solution performs safety analysis on inconsistency resolutions to identify those that can lead to resolution cycles. The proposed analysis combines instance-level information (e.g., concrete model, detected inconsistencies) and type-level information (e.g., definition of resolution types) to place resolutions into different safety categories.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
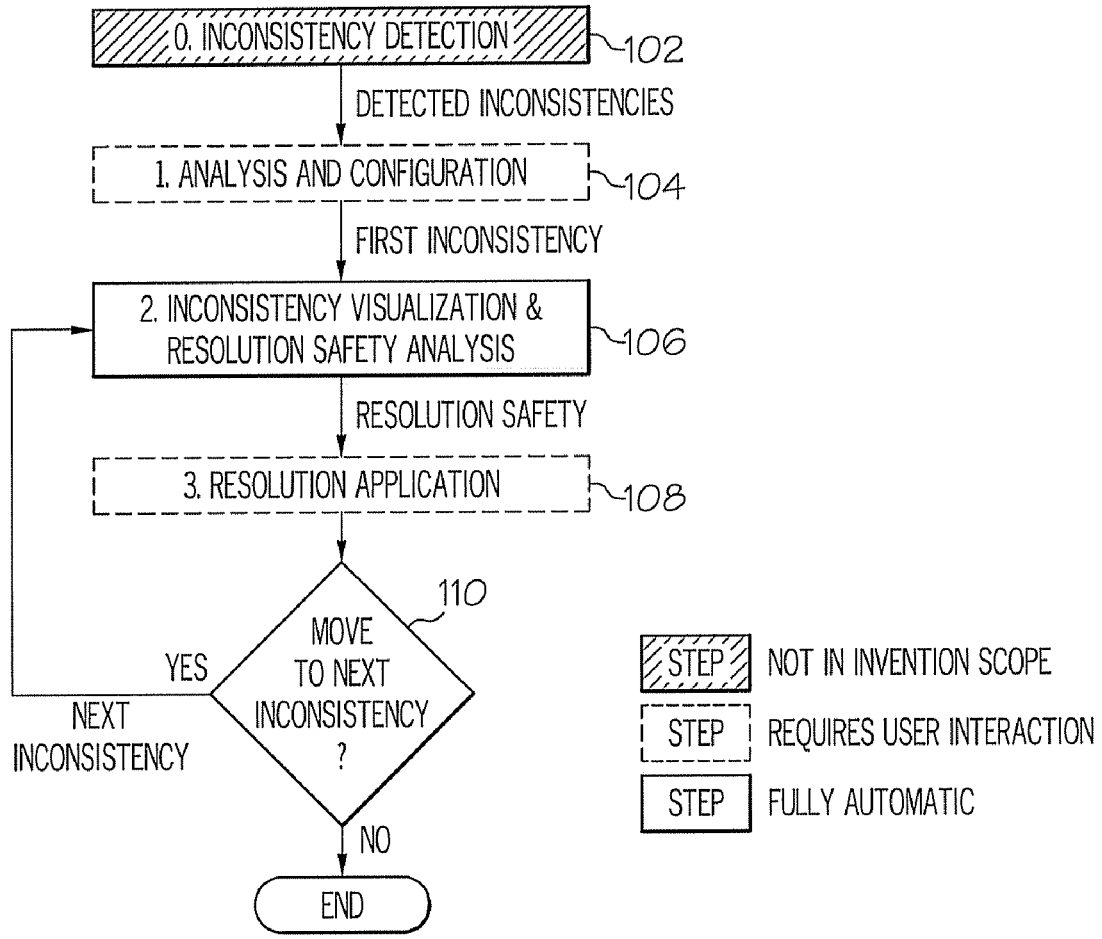
FIG. 1 is a flow diagram describing a process for providing inconsistency resolution processes in an exemplary embodiment.

The detailed description explains the preferred embodiments of the invention, together with advantages and features, by way of example with reference to the drawings.

DETAILED DESCRIPTION OF THE INVENTION

In accordance with an exemplary embodiment of the invention, inconsistency resolution processes with cycle detection are provided. The inconsistency resolution processes provide a solution that analyzes inconsistency resolutions in a model-driven software development environment to determine whether they can lead to a resolution cycle, which can then be communicated to a user before a particular resolution path is followed. The inconsistency resolution processes perform safety analysis on inconsistency resolutions to identify those that can lead to resolution cycles. The proposed analysis combines instance-level information (e.g., concrete model, detected inconsistencies) and type-level information (e.g., definition of resolution types) to place resolutions into different safety categories.

The inconsistency resolution processes provide two consistency notions for business process models: conformance and coverage. Conformance requires a given business process model to induce only those object state changes that are defined in the life cycle of the corresponding object. Coverage requires that objects used in a given process model traverse all the states in their life cycles. Conformance and coverage are precisely defined using consistency conditions that may be checked on a given business process model and a given object life cycle. The business process model is first analyzed to determine state transitions that it can induce on different objects (induced transitions), states in which objects are first encountered during process execution (first states) and states that the objects are in at the end of process execution (last states). These are used to check the consistency conditions, violations of which give rise to inconsistencies of six inconsistency types, each falling either into the conformance or coverage inconsistency categories.

The following definitions for conformance inconsistency categories are provided for ease of description:

Non-conformant transition: a task T in the given business process model induces a transition from state src to state tgt on an object of type o, but this transition is not defined in the object life cycle for o;

Non-conformant first state: a state first is an output state of task T and a first state for objects of type o in the given business process model, but the object life cycle for o does not contain a transition from the initial state to state first;

Non-conformant last state: a state last is an input or an output state of task T and a last state for objects of type o in the given business process model, but the object life cycle for o contains no transition from state last to a final state.

The following definitions for coverage inconsistency categories are provided for ease of description:

Non-covered transition: a transition from state src to state tgt is defined in the object life cycle for o, but it is not induced by any task in the given business process model;

Non-covered initial state: a state init in the object life cycle for o has an incoming transition from the initial state, but init is not a first state of o in the given business process model;

Non-covered final state: a state fin in the object life cycle for o has an outgoing transition to a final state, but fin is not a last state of o in the given business process model.

Each inconsistency has an inconsistency context that comprises models between which the inconsistency occurs (model context) and model elements that contribute to the inconsistency (model element context). The model context of any inconsistency falling into the conformance or the coverage category comprises a business process model and an object life cycle. Model element contexts can be derived from the definitions of inconsistency types. For example, the model element context of a non-conformant transition comprises the following elements of a business process model: task T and states src and tgt, while the model element context of a non-covered initial state comprises only the state init in an object life cycle.

For each inconsistency type, one or more resolution types are defined. For example, to resolve a non-conformant transition, input or output states of the context task may be adjusted, the task can be removed from the business process model altogether, or an additional transition may be added to the object life cycle.

When resolving several inconsistencies, the user always has to change from one inconsistency context to another. While such context switching is unavoidable, some context switches can be regarded as more severe than others. If the context of the current inconsistency has some elements in common with the context of the next inconsistency then the context switch can be regarded as less severe than if the two inconsistency contexts have nothing in common.

For purposes of illustration, the inconsistency resolution processes will be described with respect to object life cycles for Claim and Payment object types, which relate to a portion of a Claim handling business process model. Data flow in the process model may be modeled using disconnected input and output object pins of tasks, implying that tasks read and write objects from intermediate repositories. Object pins of different types may be marked with different colors, and selected input and output object states may be shown in the process model extract. Specification of input and output object states for tasks is the basis for defining consistency between object life cycles and business process models.

While the invention is described with respect to business process models, object life cycles and the aforementioned consistency notions for illustrative purposes, it will be understood that the inconsistency resolution processes may be applied to other model types and other consistency notions as well.

Turning now to FIG. 1, an exemplary process for implementing the inconsistency resolution processes will now be described. The inconsistency resolution processes begin with inconsistency detection (step 102) and may be optionally followed by analysis and configuration (step 104), where some pre-processing of the detected inconsistencies can be performed (e.g., inconsistencies can be ordered in a particular way that reduces the efforts of the user during resolution). The analysis and configuration steps may be implemented via, e.g., guided model inconsistency resolution processes, such as those described in co-pending U.S. patent application Ser. No. 12/017,133, filed concurrently with the instant application.

One of the primary objects of steps 106 and 108 is for the user of the inconsistency resolution processes to resolve or tolerate all inconsistencies for a business process model without limiting into resolution cycles. Inconsistency contexts are visualized one at a time together with all inconsistencies associated with that context. Resolution safety analysis is performed to place resolutions into different safety categories depending on whether they can lead to resolution cycles or not. The user applies one of the alternative resolutions for each inconsistency. These features are described further herein.

Figure 2:
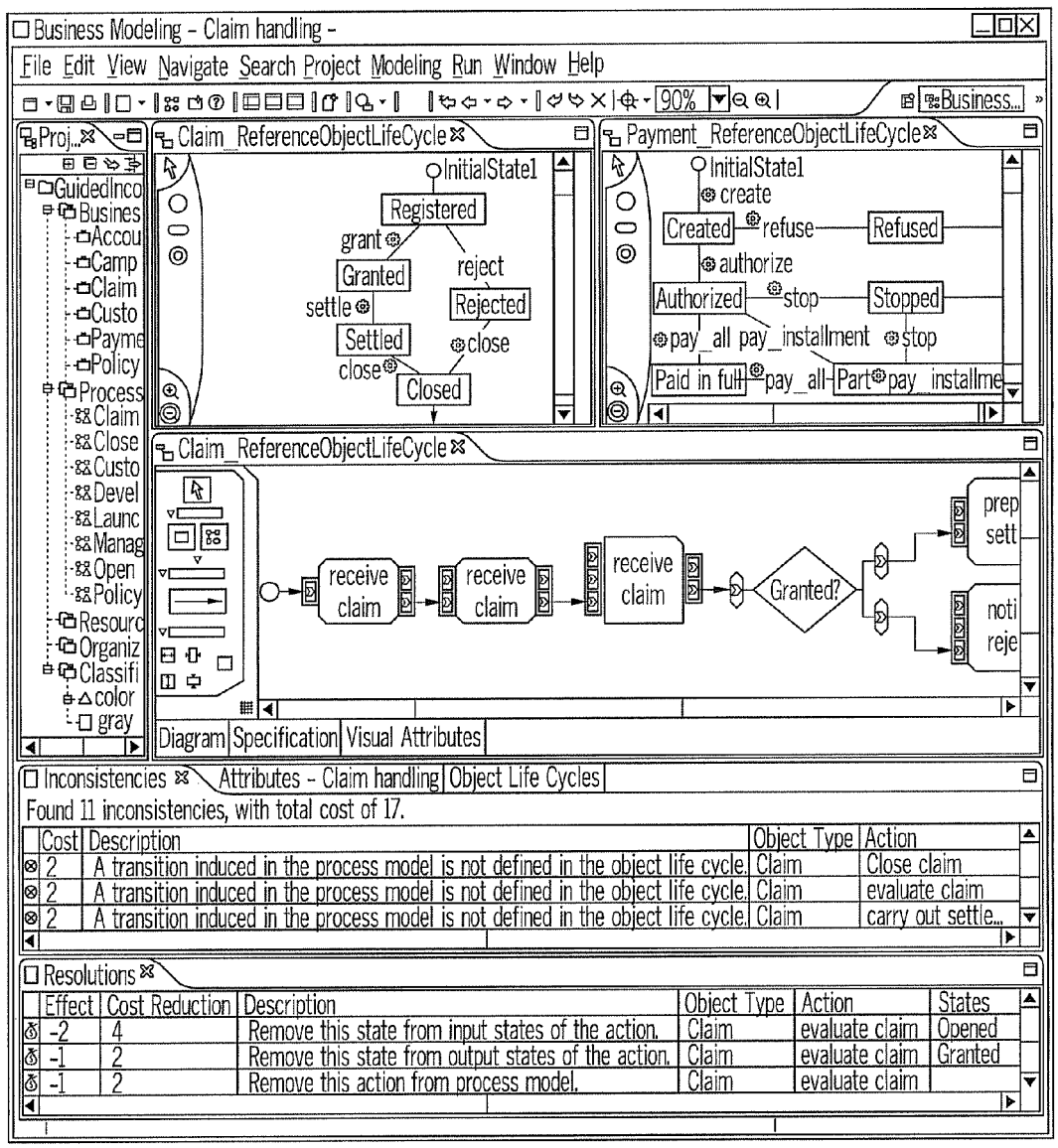
FIG. 2 is a user interface screen depicting inconsistencies and corresponding resolutions provided by the inconsistency resolution processes in an exemplary embodiment.

At step 106, detected inconsistencies are displayed to a user via a user interface screen as shown, e.g., in FIG. 2. The inconsistency selected in the list shown in FIG. 2 is visualized in the editors and its associated resolutions are displayed. For a conformance inconsistency, the related task in the business process model editor and the related object life cycle are highlighted. For a coverage inconsistency, a transition or a state in the object life cycle editor and the related business process model are indicated.

In addition to presenting a general description and other attributes of each resolution to the user, a safety analysis of each resolution is performed to determine whether it can lead to a resolution cycle. A resolution cycle occurs when a chain of resolutions that begins by resolving some inconsistency introduces the same inconsistency as a side effect at some point.

A resolution cycle may be defined as a sequence of tuples $(i_1, r_1), \ldots, (i_m, r_m)$, such that resolution $r_j$ resolves inconsistency $i_j$ for $1 \leq j \leq m$, resolution $r_j$ introduces inconsistency $r_{j+1}$ as a side effect for $1 \leq j \leq m-1$ and resolution $r_m$ introduces inconsistency $i_1$ as a side effect.

In order to determine whether a resolution can lead to a resolution cycle when applied to a concrete inconsistency, the resolution tree of this inconsistency is analyzed. A resolution tree of inconsistency i may be defined as a tree that contains nodes labeled with inconsistencies and resolutions, and is constructed as follows:

A root node labeled i is created.

Given a node labeled with inconsistency $i_j$, a child node n is created for every resolution $r_j$ that can resolve inconsistency $i_j$. Node n is labeled $r_j$.

Given a node labeled with resolution $r_k$, a child node n is created for every inconsistency $i_k$ that is introduced as a side effect of $r_k$. Node n is labeled $i_k$.

Figure 3:
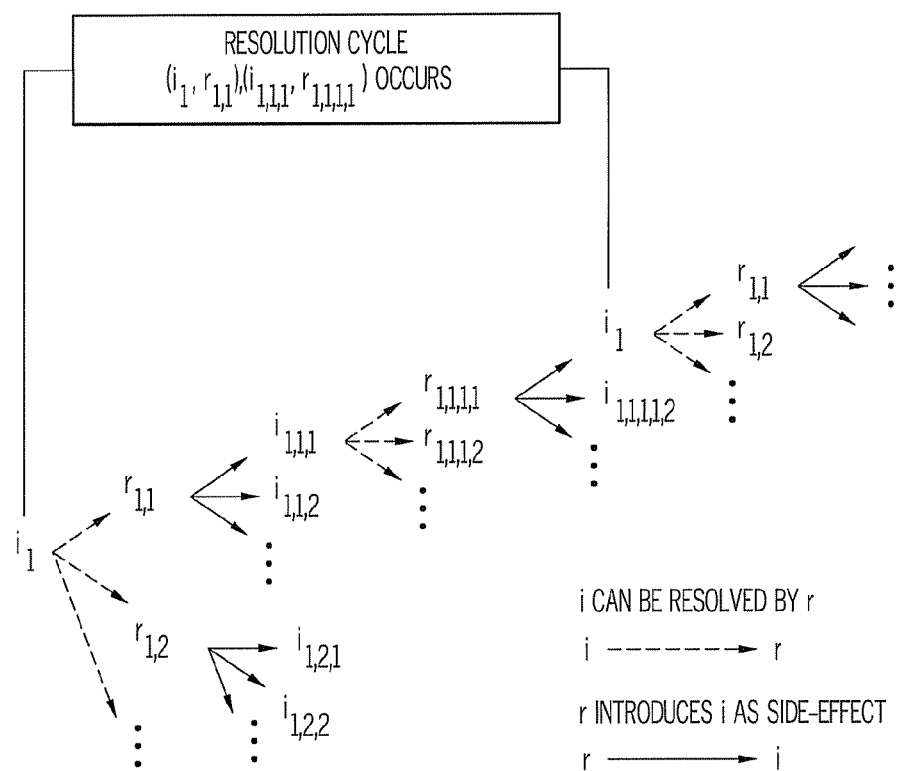
FIG. 3 illustrates a sample resolution tree for an inconsistency including a sample resolution cycle in an exemplary embodiment.

For example, a resolution cycle is shown in the resolution tree of inconsistency $i_1$ in FIG. 3. It can be seen that an occurrence of a resolution cycle leads to an infinite resolution tree.

Given a resolution r that resolves an inconsistency i, an analysis of whether beginning with this resolution it is possible to resolve all the inconsistencies subsequently introduced as side effects without a resolution cycle occurring. A resolution strategy tree may be used to make this determination. Given an inconsistency i and a resolution r that resolves i, a resolution strategy tree for (i, r) is a tree that contains nodes labeled with tuples $(i_j, r_j)$ and is constructed as follows:

A root node labeled (i, r) is created.

Given a node labeled $(i_j, r_j)$, a child node n is created for every inconsistency $i_k$ that is introduced as a side effect of $r_j$. Node n is labeled $(i_k, r_k)$ where $r_k$ is one of the possible resolutions for $i_k$.

A preorder traversal of a resolution strategy tree for (i, r) represents one possible resolution sequence or resolution strategy beginning with resolution r that resolves i and all inconsistencies subsequently introduced as side effects. There may be more than one resolution strategy tree for the same tuple (i, r) and there may also be more than one resolution strategy for the same resolution strategy tree. Given a tuple (i, r), all the possible resolution strategy trees can be constructed from the resolution tree of i.

Figure 4:
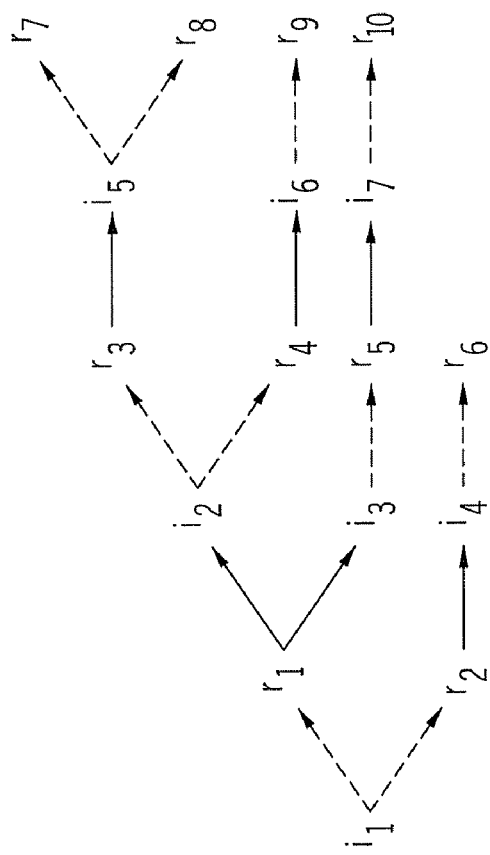
FIG. 4 illustrates examples of resolution strategy trees in an exemplary embodiment.
Figure 4:
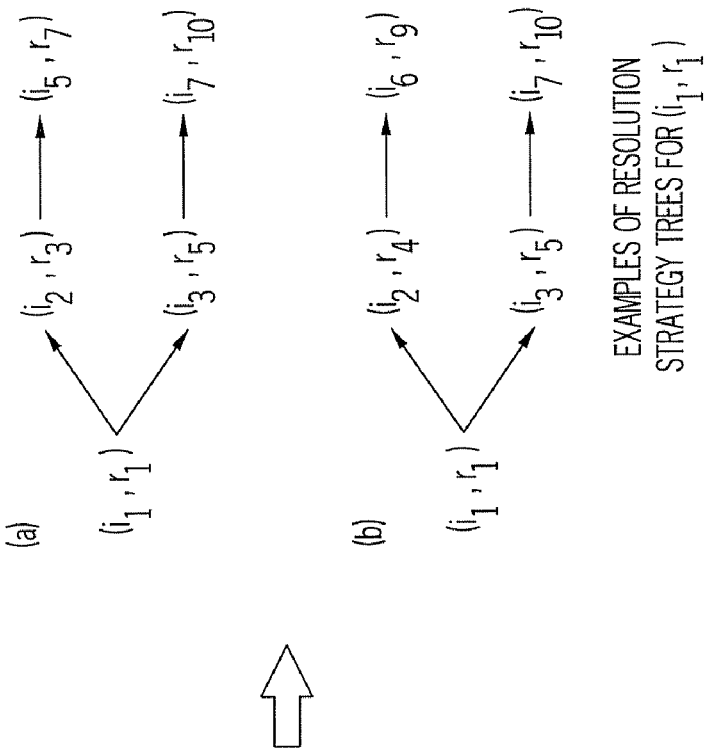

For example, FIG. 4 shows two resolution strategy trees for the same tuple $(i_1, r_1)$. Given a resolution strategy tree for (i, r), all resolution strategies derived by traversing this tree lead to a resolution cycle if the resolution strategy tree is infinite. In this case, it is said that the resolution strategy tree leads to a resolution cycle.

Based on these definitions, four safety categories for resolutions are distinguished, i.e., a resolution r that resolves inconsistency i falls into one of the following safety categories:

globally-safe: none of the resolution strategy trees for (i, r) lead to a resolution cycle;

globally-unsafe: every resolution strategy tree for (i, r) leads to a resolution cycle;

safe: at least one resolution strategy tree for (i, r) does not lead to a resolution cycle; and safety-unknown: it cannot be determined whether r falls into any of the other categories.

The inconsistency resolution processes may be utilized when side effects of a resolution can be computed in advance; that is, before resolutions are applied to a particular inconsistency (which is not always the case). This capability enables the inconsistency resolution processes to create a resolution tree and resolution strategy trees, such as those shown in FIG. 4, for any given inconsistency in a concrete mode.

By way of example, it is assumed that applying a resolution r to inconsistency i does not affect the side effects of other resolutions in the same resolution strategy tree that are not on the path from the root to the node labeled (i, r).

A complete safety analysis would search the entire resolution tree of an inconsistency, but since this leads to state-space explosion, a look-ahead approach may be used for the safety analysis to produce results in a reasonable time. Given an inconsistency in a concrete model and a look-ahead value, a finite resolution tree can be constructed for this inconsistency. With a look-ahead value x, each branch in this resolution tree would contain at most x resolutions and x+1 inconsistencies. For example, in FIG. 3, given an inconsistency $i_1$ and a look-ahead value of 2, the resolution tree would reach the depth of inconsistency $i_{1,1,1,1,2}$.

Once a resolution tree is constructed using a look-ahead, all possible resolution strategy trees could be then constructed from it and analyzed to determine a safety category for each resolution. Alternatively, a simpler approach may be taken that works directly on the resolution tree and only implicitly uses the concept of a resolution strategy tree:

Algorithm 1: Resolution tree safety analysis mark all leaf nodes $n_{leaf}$ in the given resolution tree as follows:

if $n_{leaf}$ is an inconsistency that occurs more than once on the path to the root, mark $n_{leaf}$ as globally-unsafe else if $n_{leaf}$ is an inconsistency that occurs once on the path to the root, mark $n_{leaf}$ as safety-unknown else $n_{leaf}$ is a resolution, mark $n_{leaf}$ as globally-safe
moving up one depth-level at a time, mark nodes n as follows:
  for cases where n is an inconsistency:
    if all n's children resolutions are marked globally-safe, mark n as globally-safe
    else if all n's children resolutions are marked globally-unsafe, mark n as globally-unsafe
    else if at least one of n's children resolutions is marked as globally-safe or safe, mark n as safe
    else some of n's children resolutions are marked as safety-unknown, mark n as safety-unknown
  for cases where n is a resolution:
    if all n's children inconsistencies are marked globally-safe, mark n as globally-safe
    else if at least one of n's children inconsistencies is marked as globally-unsafe, mark n as globally-unsafe
    else if at least one of n's children inconsistencies is marked with safety-unknown, mark n as safety-unknown
    else all n's children inconsistencies are marked as globally-safe and safe, mark n as safe At the end of the process described above, all resolutions in the resolution tree are placed into one of the safety categories. Resolutions are placed into the safety-unknown category when they occur on "non-cyclic" paths in the resolution tree that end with an inconsistency. For such resolutions, a type-level safety analysis is applied, which further enables a user to identify some cases where such resolutions are globally-safe or safe.

Type-Level Safety Analysis

The presented resolution tree safety analysis can be considered as instance-level analysis, as it deals with instances of inconsistencies and resolutions in a concrete model. A complete safety analysis on the instance-level is expensive, while the look-ahead approach is incomplete, as it cannot determine whether some resolutions lead to cycles and places them into the safety-unknown category. In order to refine the results of the instance-level safety analysis with look-ahead, a type-level safety analysis may be employed that exploits information about the types of inconsistencies that a resolution of a particular type can introduce as a side effect.

Figure 5:
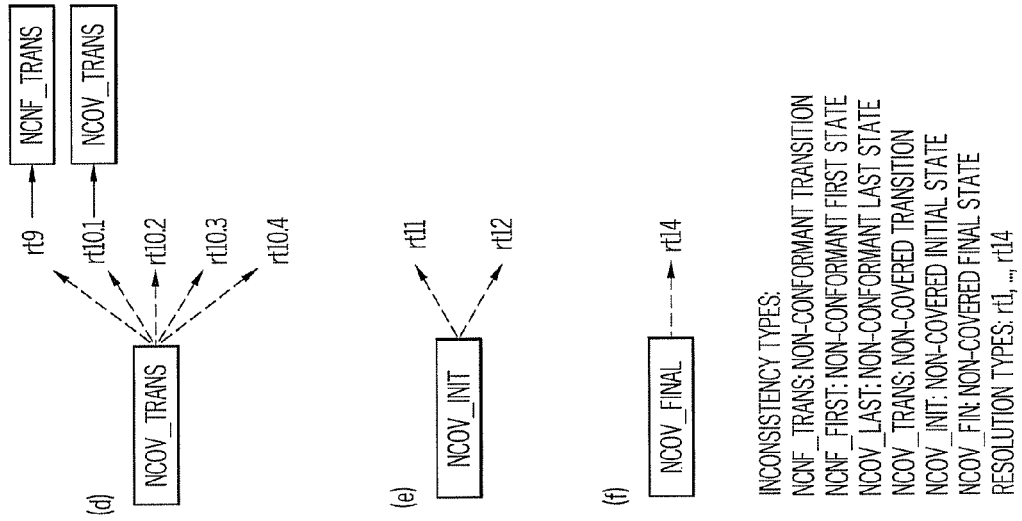
FIG. 5 illustrates examples of resolution type trees in an exemplary embodiment.
Figure 5:
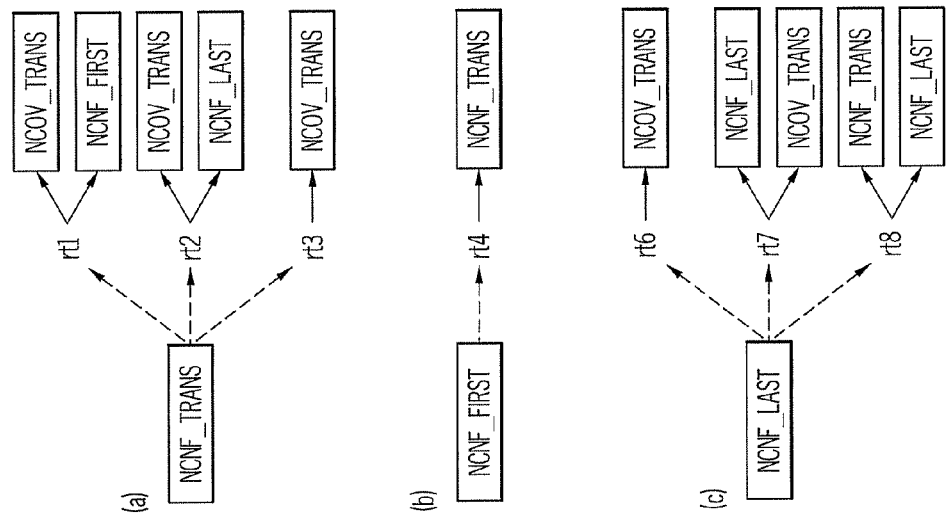

For each resolution type, a resolution type tree can be constructed showing the types of inconsistencies that it resolves and introduces as a side effect. This basically abstracts the definition of a resolution tree to the type-level. For example, FIG. 5 shows such trees for the resolution types, which are defined for resolving inconsistencies between object life cycles and business process models.

For each inconsistency type it, resolution type trees are used to compute its so-called side effect sets, where a side effect set contains all the types of inconsistencies that can be introduced as side effects under the same resolution strategy for an inconsistency of type it. The pseudocode in Algorithm 2 below shows how one side effect set for a given inconsistency type can be computed.

```
getsideeffectset(it : inconsistencytype) : set {
  rt = one of the resolution types for it
  sideeffectset = { }
  strategy = (it, rt)
  addsideeffects(rt, sideeffectset, strategy)
  return sideeffectset
}
addsideeffects(rt : resolutiontype, sideeffectset : set, strategy : sequence) {
  if (sideeffects(rt) has elements not contained in sideeffectset) do {
    for each inconsistency type se in sideeffects(rt) do {
      add se to sideeffectset
      rt = one of the resolution types for se
      append (se, rt) to strategy
      addsideeffects(rt, sideeffectset, strategy)
    }
  }
}
```

Using the method outlined above, all possible resolution strategies can be traversed and all side effect sets for an inconsistency type determined. Since a finite number of inconsistency and resolution types are standard, all the side effect sets are also finite. This computation only has to be done once when the tool supporting inconsistency resolution is implemented, after which side effect sets for inconsistency types can be simply retrieved from storage when necessary.

Figure 6:
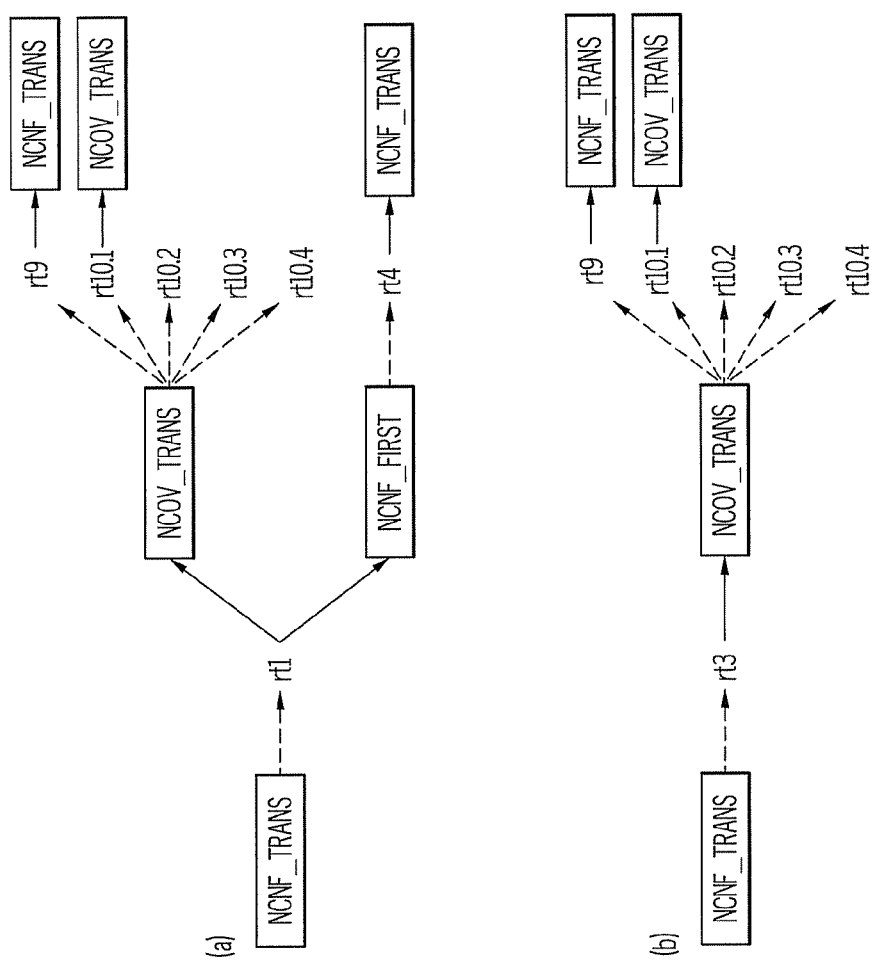
FIGS. 6A and 6B illustrate resolution strategies for a resolution type tree in an exemplary embodiment.

For example, in resolving an inconsistency of type ncnf_trans, all resolution strategies that start with resolution type rt1 give rise to the side effect set {ncov_trans, ncnf_first, ncnf_trans}, as shown in FIG. 6 (a). On the other hand, resolution strategies starting with resolution type rt3 give rise to {ncov_trans, ncnf_trans} if they contain a resolution of type rt9 and to {ncov_trans} in any other case, see FIG. 6 (b).

Given a resolution tree from the instance-level safety analysis and a resolution r that was placed into the safety-unknown category, the pre-computed side effect sets may be used for further safety analysis of r as follows. First, leaf inconsistencies $i_j$ marked safety-unknown are identified in the given tree. For each $i_j$, inconsistency types occurring on the path from the root to $i_j$ in the resolution tree are determined. Then, side effect sets of $it_j$, inconsistency type of $i_j$, are compared to the inconsistency types occurring on the path to $i_j$. If there are no matches found for at least one or all of the side effect sets, then $i_j$ is marked safe or globally-safe, respectively. Once all the leaves are checked in this way, the resolution tree safety analysis (Algorithm 1) is repeated.

The following algorithm (Algorithm 3) analyzes safety of leaf inconsistencies marked as safety-unknown:

```
getsafetycategoryforleafinconsistency(i : inconsistency, tree : resolutiontree) : safetycategory {
  path = getpathfromroot(tree, i)
  inconsistencytypesonpath = getinconsistencytypes(path)
  it = getinconsistencytype(i)
  globallysafe = true
  safe = false
  for each set in getsideeffectsets(it) do {
    if (set overlaps with inconsistencytypesonpath)
      globallysafe = false
    else
      safe = true
  }
  if (globallysafe)
    return globallysafe
  else if (safe)
    return safe
  else
    return safetyunknown
}
```

After this refined safety analysis, which takes into account instance-level and type-level information, some safety-unknown resolutions will be categorized as globally-safe or safe. Those resolutions that remain in the safety-unknown category can potentially lead to a resolution cycle.

Figure 7:
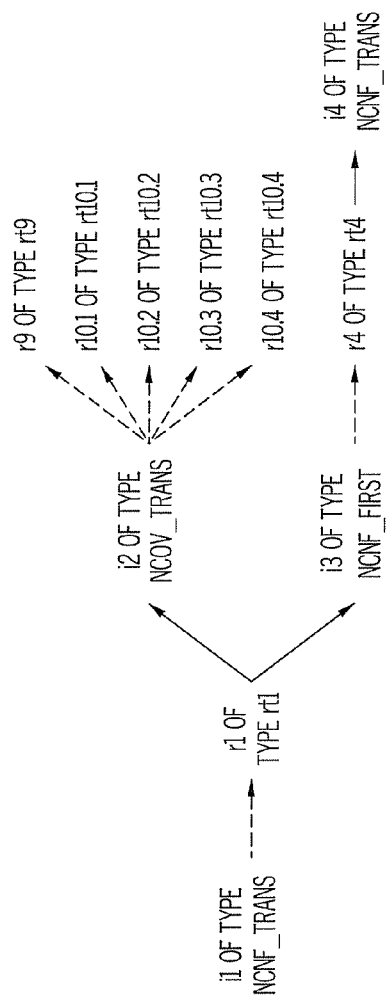
FIG. 7 illustrates an extract from a resolution tree in an exemplary embodiment.

For example, suppose that a safety analysis for resolution r1 is performed, as shown in FIG. 7. Instance-level safety analysis with a look-ahead of two places r1 into the safety-unknown category is performed, since the inconsistency i4 introduced as a side effect of r1 followed by r4 cannot be resolved on the paths considered with look-ahead of 2. Inconsistency i4 is then put through a type-level safety analysis. The path to i4 in the resolution tree contains inconsistencies of types {ncnf_trans, ncnf_first}. Inconsistency i4 is of type ncnf_trans, which among others has side effect sets {ncov_trans, ncnf_trans} and {ncov_trans}, see FIG. 6 (b). Since one of these sets does not overlap with {ncnf_trans, ncnf_first}, inconsistency i4 is marked as safe. Taking this new marking into consideration, another run through the resolution tree with Algorithm 1 determines that resolution r1 is also safe.

At step 108, the user applies one of the alternative resolutions to the given inconsistency. In order to avoid resolution cycles, the user should always choose globally-safe or safe resolutions. In certain cases, no such resolution may be available or due to other requirements the user may need to choose a resolution in another category. Since at this point the user embarks on a potentially dangerous resolution path, he can create a roll-back reference point at this time. If a cycle occurs at a later stage, the user can always roll-back and undo some resolutions.

At the end of step 108, the inconsistency list will be adjusted according to the effects of the applied resolution. Steps 106 and 108 are repeated if there is another inconsistency in the list (step 110), or the resolution process terminates.

Figure 8:
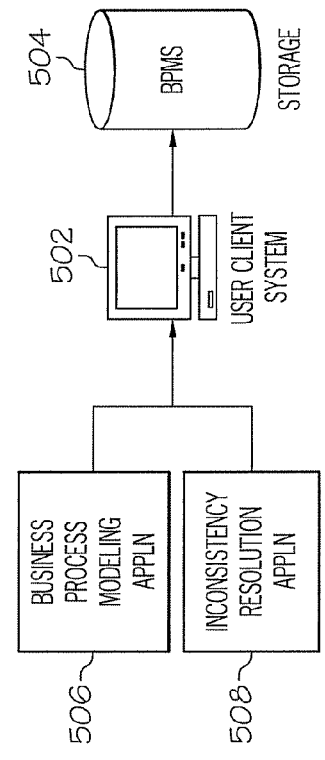
FIG. 8 is a block diagram depicting a system upon which inconsistency resolution processes may be implemented in an exemplary embodiment.

The inconsistency resolution processes may be implemented via a system as shown in FIG. 8. The system of FIG. 8 includes a user client system 502 executing a business process modeling application 506, e.g., IBM® WebSphere Business Modeler. The user client system 502 may be any type of computer processing device (e.g., general-purpose desktop) known in the art. In an exemplary embodiment, the user client system 502 also executes an inconsistency resolution processes application 508 for implementing the exemplary processes described herein. The application 508 may include a user interface for facilitating the inconsistency resolution processes described herein (e.g., via the user interface screen of FIG. 2). It will be understood that the application 508 may be a plug-in component to an existing business processing modeling application (e.g., application 506) or may be a stand-alone product that includes the business process modeling features of application 506. The user client system 502 includes memory 504 for storing business process models and other data typically found in a business process modeling software development environment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for inconsistency resolution in a model-driven software development environment, comprising:
   presenting detected inconsistencies and corresponding resolutions to a user via user interface screen;
   performing a safety analysis for each of the resolutions to determine whether the resolution, if applied to a current model, will lead to a resolution cycle when applied to a given inconsistency, the resolution cycle occurring when a chain of resolutions that begins by resolving an inconsistency introduces the same inconsistency as a side effect, the determination comprising:
   processing a resolution tree for the inconsistency and, for each resolution that resolves an inconsistency, analyzing, via a resolution strategy tree having a plurality of nodes labeled with inconsistencies and resolutions, whether beginning with the resolution, it is possible to resolve all the inconsistencies subsequently introduced as side effects without a resolution cycle occurring, the analyzing including a preordered traversing of the resolution strategy tree using a root node and at least one child node to determine whether any resolution strategies derived leads to a resolution cycle, wherein all resolution strategies derived lead to the resolution cycle if the resolution strategy tree is infinite;
   refining the resolution strategy tree by determining, for each resolution type, a resolution type tree including a type of inconsistency that is resolved and introduced as a side effect;
   categorizing the resolution that resolves the inconsistency into a safety category based upon the analysis; and
   applying a resolution for the inconsistency based upon the resolution category.

2. The method of claim 1, wherein the safety categories include:
   globally safe, specifying that none of the resolution strategy trees for the inconsistency lead to a resolution cycle;
   globally unsafe, specifying that every resolution strategy tree for the inconsistency leads to a resolution cycle;
   safe, specifying that at least one resolution strategy tree for the inconsistency does not lead to a resolution cycle; and
   safety unknown, specifying it cannot be determined whether the resolution falls into any of the other safety categories.

3. The method of claim 1, wherein the inconsistency is one of a conformance inconsistency and a coverage inconsistency.

4. The method of claim 1, wherein the resolution tree for the inconsistency includes a tree containing the nodes labeled with inconsistencies and resolution, the method further comprising constructing the resolution tree, the construction comprising:
   creating a root node;
   given a node labeled with inconsistency $i_j$, creating a child node n for every resolution $r_j$ that can resolve inconsistency $i_j$, wherein node n is labeled $r_j$; and given a node labeled with resolution $r_k$, creating a child node n for every inconsistency $i_k$ that is introduced as a side effect of $r_k$, wherein node n is labeled $i_k$.

5. The method of claim 1, wherein the resolution strategy tree includes a tree containing the nodes labeled with tuples $(i_j, r_j)$, the method further comprising constructing the resolution strategy tree, the construction comprising:

creating a root node labeled (i, r);

given a node labeled $(i_j, r_j)$, creating a child node n for every inconsistency $i_k$ that is introduced as a side effect of $r_j$, wherein Node n is labeled $(i_k, r_k)$ where $r_k$ is one of the possible resolutions for $i_k$.

6. The method of claim 1, wherein the safety analysis is an instance-level safety analysis associated with instances of inconsistencies and resolutions in a concrete model, the method further comprising:

refining results of the instance-level safety analysis using a resolution type-level safety analysis for exploiting information about types of inconsistencies that a resolution of a particular type can introduce as a side effect, the refining comprising:

creating a resolution type tree by abstracting the definition of a resolution tree to a resolution type level; and for each inconsistency type, computing corresponding side-effect sets, each side effect set containing all the types of inconsistencies that can be introduced as side effects under the same resolution strategy tree for an inconsistency type.

7. The method of claim 1, wherein processing the resolution tree includes traversing the resolution tree.

* * * * *